UNITED STATES PATENT OFFICE.

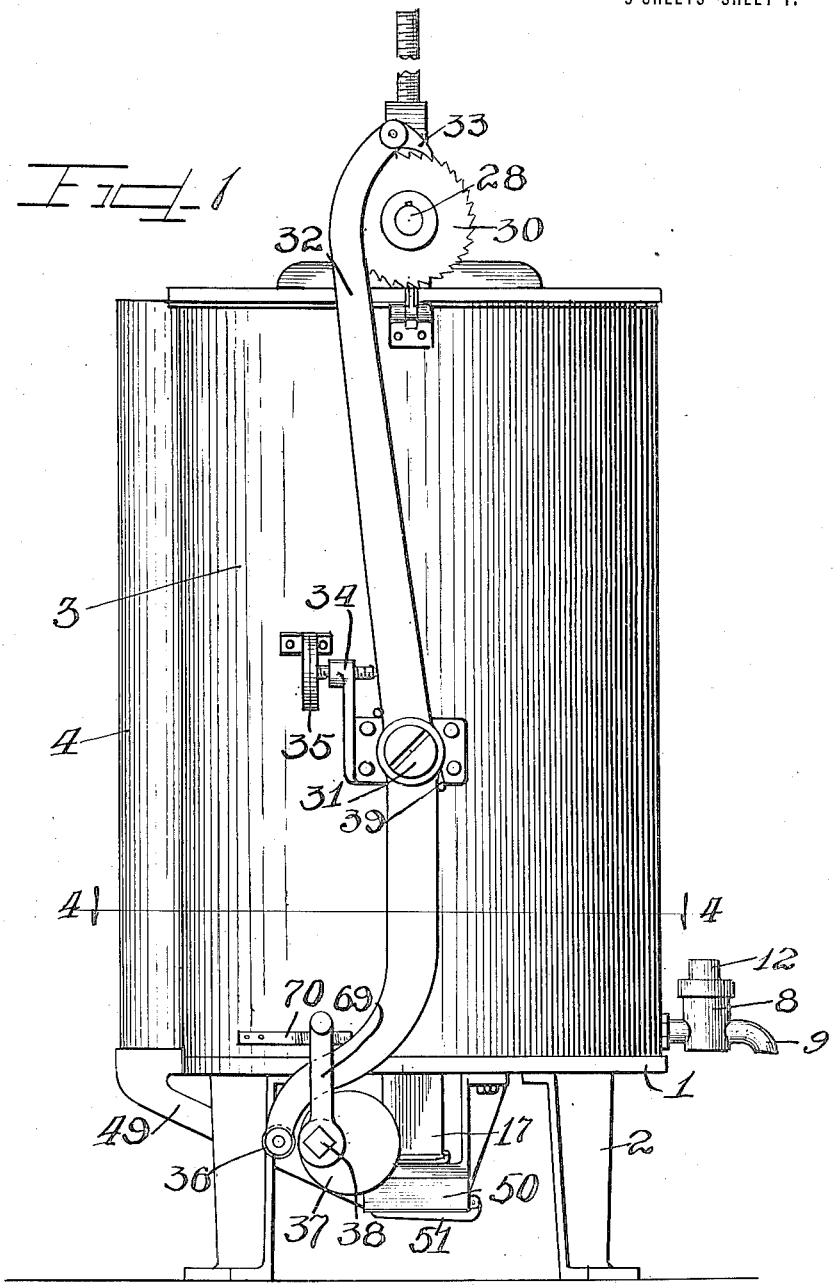

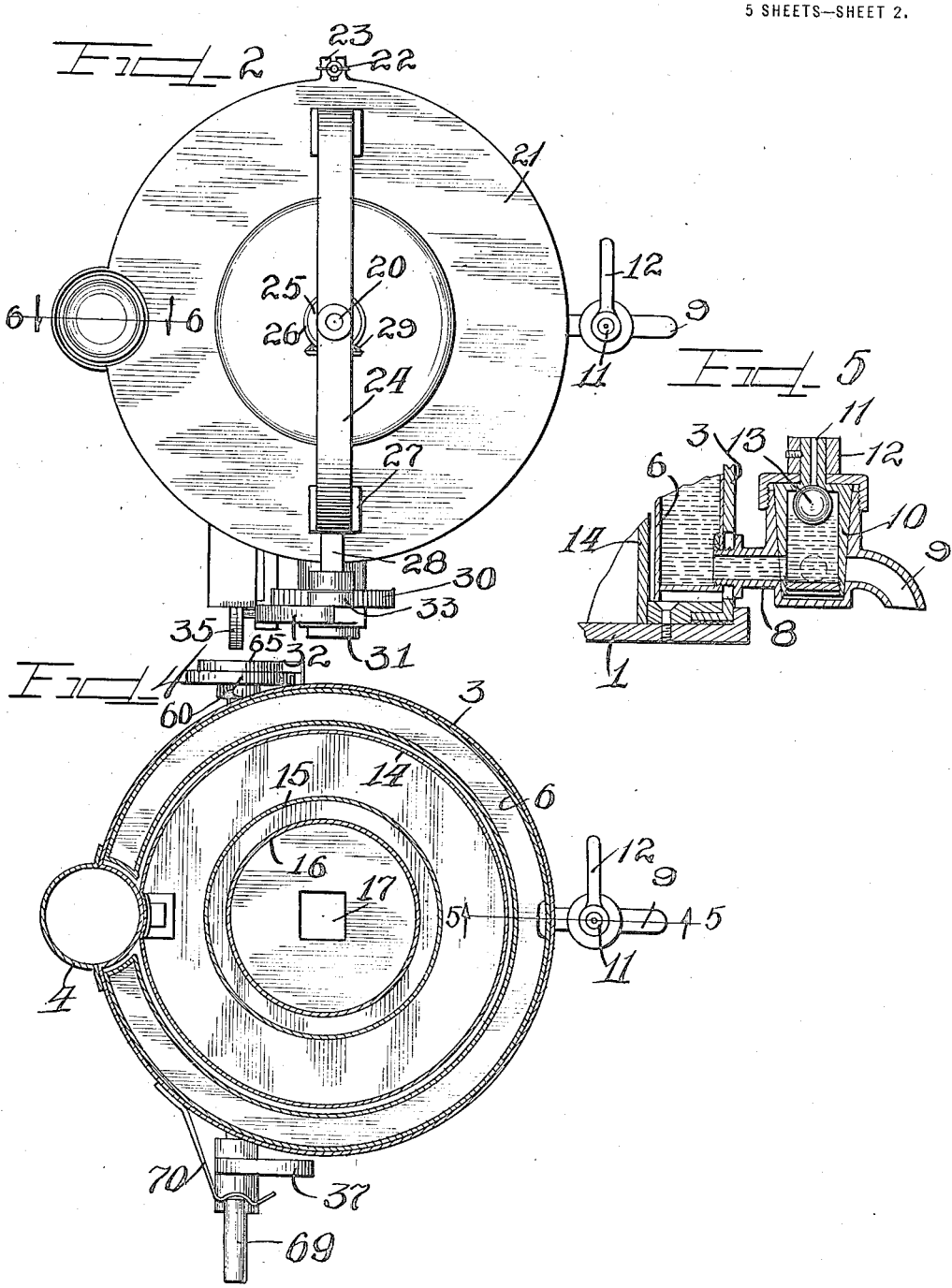

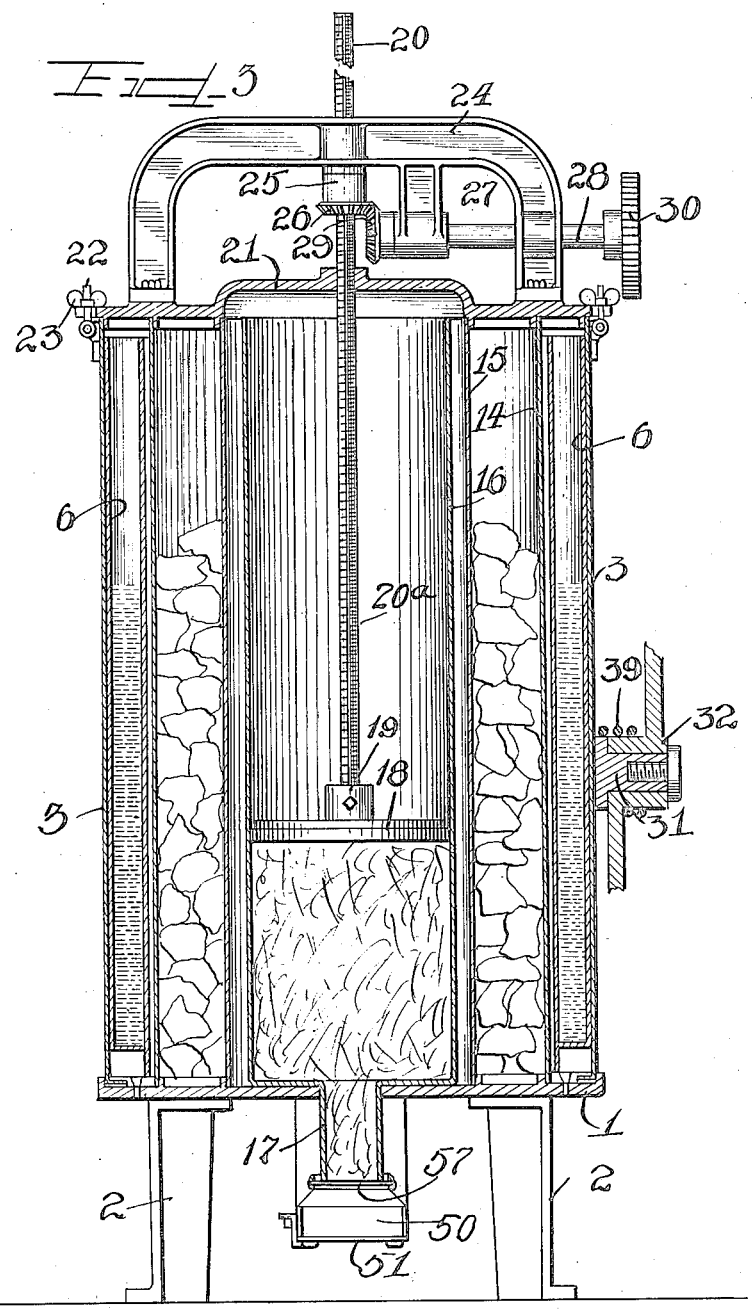

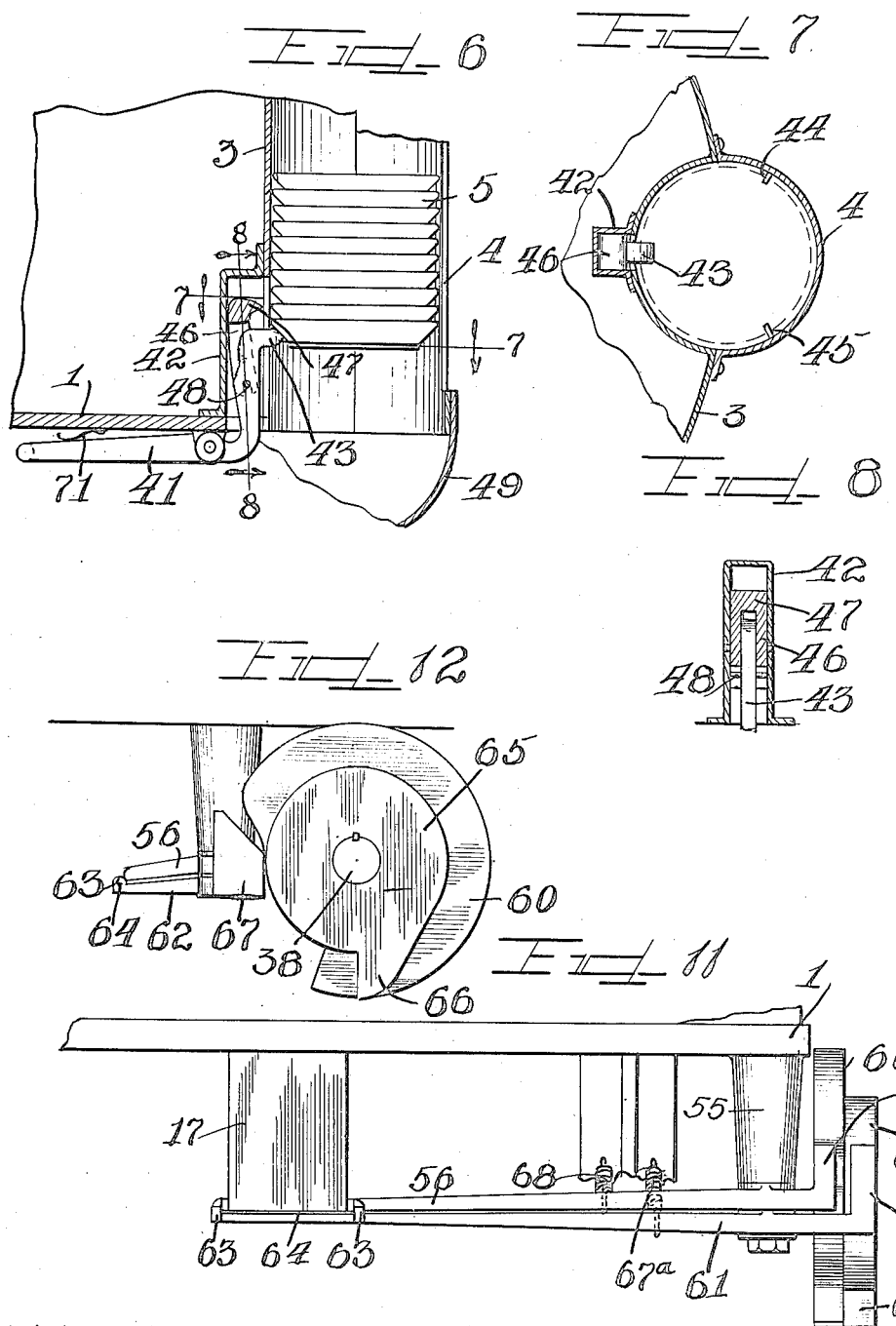

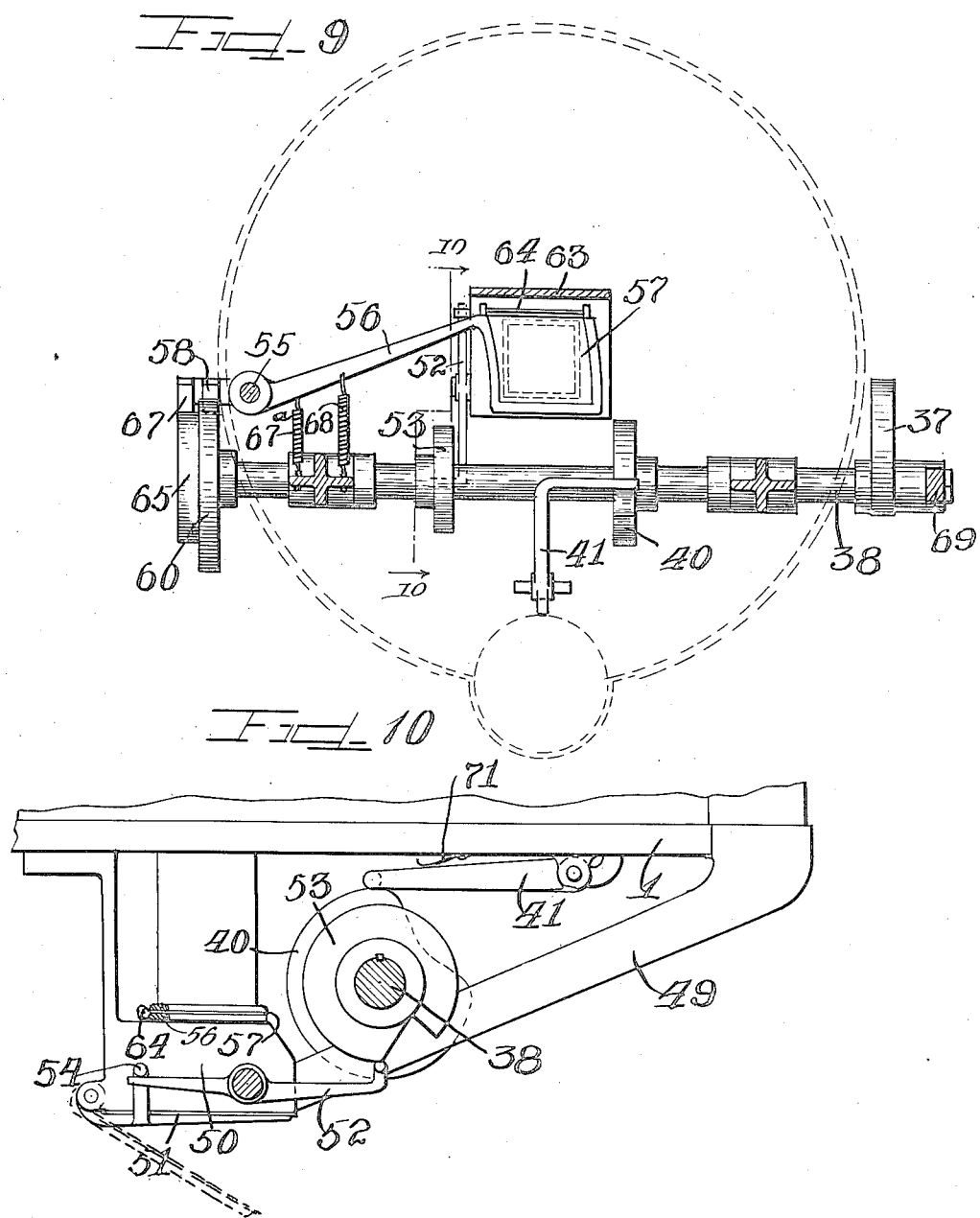

FRANK M. SCHAEFER, OF CHICAGO, ILLINOIS, ASSIGNOR TO SCHAEFER MANUFACTURING COMPANY, OF CHICAGO, ILLINOIS, A CORPORATION OF ILLINOIS.

BUTTER-CUTTER.

1,165,716.  Specification of Letters Patent.  Patented Dec. 28, 1915.

Application filed November 29, 1912. Serial No. 734,016.

*To all whom it may concern:*

Be it known that I, FRANK M. SCHAEFER, a citizen of the United States, and a resident of the city of Chicago, in the county of Cook and State of Illinois, have invented certain new and useful Improvements in Butter-Cutters; and I do hereby declare that the following is a full, clear, and exact description of the same, reference being had to the accompanying drawings, and to the numbers of reference marked thereon, which form a part of this specification.

This invention relates to improvements in dispensing apparatus, but for brevity is entitled "butter cutter", although adapted to dispense milk or cream, and also to cut butter and dispense the same in patties.

It is a general practice at hotels, restaurants, and elsewhere, to serve butter at the table in the form of individual patties. This is, of course, hygienic. It is also economical as tending to avoid waste through the contamination of butter from other foods, and as enabling the amount of butter served to be so suited to the needs of the user as to avoid the necessity of any considerable waste, each person being served with one or more patties at approximately what he may require for consumption during the meal. The same is also true of the dispensing of milk or cream, the best hygienic practice (and also economy) being found in serving the milk or cream in individual creamers, one or more at each plate.

The object of this invention is to afford a dispensing apparatus into which a cake of butter may be inserted, and also the patty dishes to receive the same, and whereby the cake of butter may be cut into a succession of uniform patties and delivered one by one to the patty dishes and thence from the machine.

It is also an object of the invention to afford a dispensing apparatus for cutting a cake or mass of butter or the like, into patties, placing the same upon the patty dishes and discharging the same for service without the necessity of the operator touching either the butter or the dish with the hand.

It is a further object of the invention to afford a refrigerated dispensing apparatus adapted to contain butter, and also milk or cream, and adapted to automatically deliver therefrom the butter patties, suitably dished, and ready for service.

It is a further object of the invention to afford a construction whereby the machine may be adjusted to cut a patty of the desired thickness.

It is also an object of the invention to afford a milk or cream receptacle and dispensing means for delivering therefrom a predetermined amount at each actuation of the dispensing faucet therefor, and to so construct the dispenser as a whole as to afford concentric chambers or receptacles for the butter, for the refrigerant and for the cream, and so constructed as to permit the device to be readily disassembled, cleaned and sterilized, and when assembled to occupy but small space.

It is, of course, an object of the invention to afford an exceedingly simple, compact and durable device, whereby the materials dispensed are at all times maintained in a sanitary condition, and from which the same may be dispensed in regulable amounts to suit the requirements of individual service.

The invention (in a preferred form) is illustrated in the drawings, and hereinafter more fully described.

In the drawings: Figure 1 is a view in side elevation of a dispensing apparatus embodying my invention. Fig. 2 is a top plan view thereof. Fig. 3 is a central vertical section. Fig. 4 is a section on line 4 of Fig. 1. Fig. 5 is an enlarged, fragmentary section on line 5 of Fig. 4. Fig. 6 is an enlarged fragmentary section on line 6, of Fig. 2. Fig. 7 is a fragmentary detail section on line 7, of Fig. 6. Fig. 8 is a fragmentary detail section on line 8 of Fig. 6. Fig. 9 is a top plan view of the cam shaft and cams thereon, and levers actuated thereby, with the exception of the feed lever, and showing the superposed containers in dotted lines. Fig. 10 is an enlarged, fragmentary section on line 10 of Fig. 9. Fig. 11 is an enlarged, fragmentary detail of a part of the cutting mechanism. Fig. 12 is an enlarged view in elevation, of the cams and actuating lever for the cutter.

As shown in the drawings: 1, indicates an approximately circular base, which may be constructed of cast metal or other suitable material, and is mounted on legs 2, to support the same at a desired height above the dispensing table, and secured upon said base 1, is a container or casing 3, shown as cylindric, and having connected in one side thereof a smaller cylindric casing 4, to receive the patty dishes 5, which are inserted therein stacked or nested, as shown in Fig. 6. Fitted within the casing is a substantially annular container 6, for the cream or milk, which extends around the inner side of said casing, and substantially to the dish casing 4, as shown in Fig. 4, and threaded into which, through an aperture in the wall of the casing, is a measuring or dispensing faucet comprising the body 8, of the faucet, and spout 9, and revoluble hollow plug 10, the chamber of which is of a sufficient size to hold the quantity of cream it is desired to dispense with one actuation of the faucet. Two bores or apertures are provided in said plug, one adapted to register with the passage leading to the cream container when the other is closed against the wall of the faucet body, as shown in Fig. 5, the other adapted to register with the spout when the first of said apertures is closed against said faucet body by the rotation of the plug 90°.

As shown, a stem 11, extends upwardly from said plug, and engaged thereto is a handle 12, for actuating the plug. An air vent opens through said stem into the chamber in said plug, and within said plug is provided a float 13, which may be a ball, and which rises with the inflow of the cream to close said vent when the chamber is full, thus limiting the amount of the liquid that can flow into said chamber and permitting full discharge therefrom when the faucet is actuated to discharge position, and by falling away from said vent permits the inflow of air, thereby enabling only a predetermined amount of cream to be discharged at one actuation of the faucet.

Secured within said casing at the inner side of the annular cream container, and secured to the base in any suitable manner to afford a tight joint, is a cylindric shell or wall 14, and spaced a suitable distance therefrom is a corresponding inner wall 15, affording a chamber between the same and the wall 14, to receive ice and salt, or any other suitable refrigerant. Removably disposed within the inner wall 15, of the refrigerant chamber, is the container 16, for butter. This, as shown, is constructed of suitable sheet metal, and is provided with a rectangular or other suitable discharge pipe 17, also of sheet metal, which extends downwardly through a corresponding aperture in the base 1, and through which the butter is pressed. Fitting within said butter container, is a presserhead or plunger 18, provided with a central, upwardly directed boss 19, rigidly secured in which, at its lower end, is a screw shaft 20, of suitable length, which extends above the top of the dispensing apparatus, and is of a length to permit the plunger or presserhead to be forced thereby to the bottom of said container.

A cover 21, is rigidly (but removably) secured on the outer walls or casing 3, of the device, by means of bolts 22, hinged to said casing, and adapted to swing upwardly into radial slots in the edges of the cover, as shown in Fig. 3, and provided with wing nuts 23, whereby the cover may be clamped in place to close the casing, milk container, refrigerant chamber, and butter container. Said cover, as shown, is provided with a central aperture to receive the shaft 20, therethrough. The dish container, as shown, is not closed by said cover, and requires no cover, but, if preferred, of course, a separate cover may be provided therefor, and may be either connected with, or disconnected from the cover 21, as preferred. Rigidly bolted on the top of said cover, and extending transversely thereover, is a frame 24, having a central aperture therethrough to receive the screw shaft 20, and a downwardly facing bearing face surrounding said shaft aperture against which engages the upwardly directed end of the hub 25, of a downwardly facing bevel gear 26, integral with said hub. Said hub has threaded engagement with said shaft and serves when rotated, to force said shaft longitudinally. The shaft is provided with a keyway 20ª for its entire length to receive a key or feather secured in said frame to fit therein, and to hold said shaft from rotation, although permitting the shaft to slide through said frame when actuated by the rotation of said bevel gear 26. Journaled in said frame and in a bearing 27, adjacent the screw shaft, is a horizontal shaft 28, provided with a bevel pinion or gear 29, at the inner end, which meshes with the bevel gear or pinion 26, before described. Secured on the outer end of the shaft, is a ratchet wheel 30, the teeth of which, as indicated in Figs. 1 and 3, are directed so that when the same is actuated by engagement with said teeth, the bevel gear 26, is rotated to force the shaft 20 and presserhead 18 downwardly.

Secured on the casing 3, and preferably below the middle thereof, is an outwardly directed stud shaft 31, journaled on which is a lever 32, one end of which extends upwardly to a point above said ratchet wheel 30, and is provided with a spring pressed pawl 33, of any preferred construction, which bears upon the periphery of the wheel in position to engage the teeth to rotate said ratchet wheel when the lever is actuated in one direction. Secured on the casing at the rear side of said lever, is an arm 34, having a threaded aperture therethrough, in which engages a set screw 35, adapted to be adjusted into bearing against the rear side of the lever to limit the throw of the upper end of the lever, as shown in Fig. 1. The other end of said lever extends downwardly and curves slightly rearwardly, and is provided at its extremity with an anti-friction roller 36, which bears on the periphery of an eccentric 37, secured upon an actuating shaft 38, which extends transversely beneath the machine and slightly at the rear of the discharge aperture for the butter patties. Said eccentric or cam 37, is mounted upon said shaft to afford large eccentricity, or, in other words, a considerable movement or throw of said lever 32 when actuated by the eccentric, the return movement of said lever in following said eccentric, however, being limited by the adjustment of the set screw as desired, and, as shown, a spring 39, is provided at the fulcrum of said lever and engaged to the lever and to the casing in any suitable manner to insure the return of the lever to normal after each actuation by said eccentric. Cams or eccentrics are provided on said shaft 38, to release the patty dishes one by one from the stack or nest to permit the same to fall to a position beneath the discharge passage for the butter patties, and in time to receive the next succeeding butter patty cut from the cake, thereon. Cams or eccentrics are also provided on said shaft to actuate the mechanism for severing the patty from the cake and for releasing or discharging the patty dish with the patty thereon, from the machine. For the purpose of releasing the patty dishes, a cam 40, is secured on said shaft, and fulcrumed on the under side of said table or base 1, is a lever 41, one end of which engages on the periphery of the cam 40, and the other end of which extends upwardly in a recess or housing 42, and is provided with a tapered horizontally directed head 43, which projects normally into the dish casing in position to engage beneath the stack of dishes, as shown in Fig. 6, and positioned in the opposite side of the casing to afford (together with said head) a three point suspension for the stack of dishes, are inwardly projecting pins 44 and 45, which are equidistant from said supporting head 43, and from each other. A lever 46, is fulcrumed in said housing 42, and is provided with a horizontally directed head 47, corresponding with the head 43, and adapted to project into the dish casing to engage the second dish from the bottom at the moment of withdrawal of the head 43, from beneath the bottom dish. Said lever 46, is slotted or yoked at its lower end to engage a pin 48, set in the side of said lever 41, within said housing, so that the actuation of the lever 41, to retract the head 43, acts to project the head 47, into engaging position, thereby permitting but one dish to fall at a time.

An inclined chute 49, communicates with the bottom of the dish compartment and leads inwardly to a point directly beneath the discharge passage for the butter, and is there slightly enlarged to afford a box or chamber 50, in which the patty dish is supported in position to receive the patty when it is severed from the cake. The bottom 51, of said box, is hinged on the front side thereof and when opened affords an incline down which the butter dish with the patty thereon, slides outwardly from beneath the machine. A lever 52, is pivotally mounted upon the wall of the compartment or box 50, in any suitable manner, and at one end engages on the periphery of a cam wheel 53, which is also engaged on the shaft 38. The other end of said lever extends beneath an arm 54, secured on said hinged bottom near the hinged edge thereof to normally support the same in closed position, as shown in Fig. 10. The cam wheel 53, is provided with a deep notch in its periphery, one side of which is substantially radial to permit quick release of the hinged bottom 51, and the other side of which affords an easy incline to facilitate the easy raising of the hinged bottom to normal position by said lever.

Mechanism is provided for holding the delivery passage for the butter normally closed to prevent contamination from atmospheric or other sources, and also mechanism for cutting the butter patties to the desired thickness. For this purpose, a downwardly directed boss 55, is provided integral with the base 1, and at the opposite side from the actuating crank, and fulcrumed on the lower end thereof to swing horizontally beneath said base, is a lever 56, having a yoked frame at its inner end, on which is secured a relatively thin plate 57, adapted to swing beneath the lower end of said butter delivery passage to effectively seal the same. Said boss is adjacent the periphery of the base 1, and the outwardly directed arm or end of said lever is relatively short and is provided with an upwardly directed contact head 58, which projects beyond the edge of said lever toward the shaft 38, as shown in Fig. 9, and is normally engaged by a cam 60, rigidly secured on said shaft and cut away to enable said lever at normal position to swing back to close said butter passage. The greater portion of the periphery of said cam, however, is concentric with said shaft, acting to hold said plate 57, or closure for said butter discharge passage, away from said passage during the cutting operation.

Journaled on the same pivot, with the lever 56, is a lever 61, the longer end of which extends substantially parallel with the lever 56, before described, and which also is provided with a yoke at its extremity corresponding with the yoke at the extremity of the lever 56, and indicated by 62. Upwardly projecting bosses 63, are provided on each side the throat of said yoke and connected thereon and extending therebetween is a wire 64, which normally lies slightly at the rear of said closing plate 57, and substantially in the same plane therewith. A cam 65, is rigidly secured on the outer end of the shaft 38, in close contact with the cam 60, before described, and is substantially concentric with said shaft for the greater part of its periphery, but is provided at one side thereof with an inclined tooth 66, adapted to engage the inclined head 67, on the outer end of said lever 62, after the retraction of the closing plate, and acting to swing said lever toward the shaft 38, carrying the cutting wire 64, across the mouth of the butter discharge passage to sever the patty therefrom. The rear side of said tooth 66, is substantially radial to permit quick release of said lever after the cutting operation is completed, and slightly before the release of the lever 56, thus permitting the cutting lever to first return to normal under the action of a suitable spring applied thereto, which is followed immediately by the release of the lever 56, from its cam, and its return to normal or closing position, as shown in Fig. 9, any suitable spring or springs 67ª and 68, being used for these purposes. A crank 69, is provided on one end of the shaft 38, as shown in Figs. 1 and 4, to actuate said shaft, and as shown, a resilient detent pressing a leaf spring 70, is secured on the wire or side of the casing or base to engage said crank to normally support the same and hold the mechanism at normal.

The operation is as follows: The various cams are so adjusted on said shaft 38, that the cam 60, first actuates the lever 56, to open the lower end of the butter discharge passage, said cam holding said closing plate 57, retracted therefrom, while the cam 37, actuates the lever 32, to rotate the shaft 28, and pinion 26, and internally threaded hub 25 to feed the presser-head downwardly a distance corresponding with the swing of the lever 32, as limited by the adjustment of the set screw 35. While this movement is progressing, the cam 40, has rotated to position to permit the lever 41, to swing downwardly under the impulse of its spring 71, shown in Fig. 10, such downward movement releasing the lowermost butter dish by the retraction of the supporting head 43, simultaneously with the engagement of the supporting head 47, beneath the edge of the next succeeding dish above the same. Said dish, when released, falls to the inclined chute 49, and slides into the compartment 50, beneath the butter passage. The continued rotation of said shaft has now brought the tooth 66, on the cam 65, into engagement with the head 67, of the cutting lever 62, thereby swinging the wire 64, across the butter passage and severing a patty therefrom, the thickness of which, of course, will depend upon the downward feed of the presser head before described. Simultaneously with the severing of said butter patty and the fall thereof to the butter dish beneath the same, the cam 53, has reached a position to release the lever 52, the end of which now falls into the notch therefor in the periphery of said cam, permitting the bottom 51, for the compartment 50, to swing downwardly affording an inclined plane down which the butter dish with the patty thereon, slides into position to be conveniently reached by the operator. Immediately thereafter, said hinged bottom is swung upwardly to closed position, and the cam 60, releases the end of the lever 56, permitting the same to swing back to again close the butter passage and the crank engaged by the spring and detent 70. The swing of the lever 32, is, of course, limited by the set screw 35, and owing to the large eccentricity of the cam 37, said lever under the tension of its spring 39, follows said cam 37, until the back of the lever is engaged by the set screw, which, of course, arrests the lever from further movement. Should a thicker patty be required, the set screw 35, is retracted to permit a greater amplitude of movement of the lever 32, and inward adjustment of the set screw, of course, inasmuch as it reduces amplitude of movement of said lever, decreases the downward feed, and consequently results in a thinner patty. In this manner, the number of patties cut from a single pound of butter may be varied through a wide range and as desired for the service. Inasmuch as the discharge passage from the butter container is normally closed except during the actual cutting operation, the butter is thereby protected from contamination and preserved in a sanitary condition. Obviously too, the construction permits of the device being readily disassembled for cleaning, inasmuch as removal of the cover permits the butter container and the cream container to be lifted out of the machine, it only being necessary to first remove the faucet which extends through a suitable aperture in the wall of the casing, and is threaded into the outer wall of the cream container, as illustrated in Fig. 5.

I have shown but a preferred form of my invention, although, of course, numerous features of construction and operation may be varied without departing from the principles of my invention. I therefore do not purpose limiting myself otherwise than necessitated by the prior art.

I claim as my invention:

1. A dispensing apparatus, embracing a receptacle to contain plastic material, a restricted bottom discharge passage therefor, a presser head or plunger fitting in said container, means for vertically actuating said head to regulably press the material downwardly through said discharge, a cutter positively actuated to swing across said discharge passage to sever exuding material therefrom, a dish magazine, means for discharging a single dish therefrom and positioning it beneath said discharge to receive the severed material, and mechanism for discharging the charged dish.

2. A dispensing apparatus, a receptacle to contain plastic material, a restricted bottom discharge passage therefrom, a vertically movable presser head or plunger fitting in said container, a cutter positioned to swing across said discharge passage to sever exuding material therefrom, a dish magazine, means for discharging a single dish therefrom and positioning it beneath said material discharged to receive the severed material, mechanism for discharging the dish, and a common means for actuating all of said mechanisms in their proper sequence.

3. A device of the class described, embracing an upright plastic material container, a restricted discharge passage communicating through the bottom thereof, a container for individual dishes, means for releasing one of the dishes at a time for delivery to a point below the discharge passage, means for pressing the material downwardly through said passage, means for severing a patty from the material at said passage to fall upon said dish, and mechanism for releasing said dish with the patty thereon from the machine.

4. A machine of the class described, embracing a plurality of lever mechanisms for supporting individual dishes and delivering the same one by one to loading position, means for feeding a cake of plastic material through said machine, mechanism acting to cut patties one by one from the cake of plastic material to discharge the same singly, each to an individual dish, and mechanism connected to the cutting and feeding mechanism and timed for operation with respect thereto to discharge dishes when loaded from the machine.

5. A machine of the class described, embracing feeding means for a cake of plastic material, mechanism for severing patties from the cake, a plurality of cam controlled lever mechanism for delivering individual dishes one by one successively into position each to receive a severed patty thereon, and automatic mechanism connected with said severing and delivering mechanisms operating partly by gravity for discharging the dishes one by one from the machine when loaded each with a patty.

6. A machine of the class described, embracing feeding means for a cake of plastic material, mechanism connected thereto for severing material from the cake in patties, mechanism connected to said feeding means and severing mechanism for releasing individual dishes one by one into position to receive said patties singly as they fall from the cutter, means operated partly by gravity for discharging the dish with its patty from the machine, and a single shaft for operating all said mechanisms in sequence.

7. In a machine of the class described, an upright container for the material in cakes, a discharge passage for the container, means pressing the material therethrough, a cutter for severing the material when protruded beyond said passage by such pressure, means closing the material passage with the retraction of the cutter, means for delivering dishes one by one into position to receive the patties singly as they fall from the cutter, means for discharging said dishes each with its patty from the machine successively, and adjustable means for varying the thickness of the patties.

8. In a machine of the class described the butter container having a bottom discharge passage and a cutter to sever the patties from the butter protruded through said passage, means closing said passage to retain the butter in said container, a presserhead fitted in said compartment, a threaded stem thereon, a nut threaded thereon, one end thereof affording a pinion, a fixed element against which said nut bears to force said stem downwardly, a pinion meshing therewith, a shaft engaged with said pinion, a ratchet wheel on the outer end thereof, a lever pivoted on the machine, a pawl carried on one end thereof and engaging said ratchet wheel, a rotative shaft, an eccentric thereon engaging the end of said lever remote from said pawl and acting to swing the same to actuate the ratchet wheel, and a set screw adjustably mounted to regulably limit the swing of said lever in one direction and to vary the distance of feed of said presserhead.

9. In a device of the class described the butter container and discharge passage therefrom, a cover normally closing said discharge passage, regulable means for pressing butter through said discharge aperture when the closure is removed, a cutter for severing the butter in patties as it protrudes in said passage, screw means for adjustably controlling the vertical movement of said regulable means and varying the thickness of the butter patties, and actuating means for removing said closure, actuating said pressing means and operating said cutter, and then returning the cutter and closure to normal.

In testimony whereof I have hereunto subscribed my name in the presence of two subscribing witnesses.

FRANK M. SCHAEFER.

Witnesses:
JOHN D. HAY,
LAWRENCE REIBSTEIN.